No. 733,534. PATENTED JULY 14, 1903.
W. W. BENSON.
COUPLING FOR PIPES, CONDUITS, &c.
APPLICATION FILED AUG. 16, 1902.
NO MODEL. 2 SHEETS—SHEET 1.

WITNESSES:

INVENTOR

BY

ATTORNEY.

No. 733,534. PATENTED JULY 14, 1903.
W. W. BENSON.
COUPLING FOR PIPES, CONDUITS, &c.
APPLICATION FILED AUG. 16, 1902.
NO MODEL. 2 SHEETS—SHEET 2.

WITNESSES:
INVENTOR
Wm. W. Benson
BY
Charles N. Butler
ATTORNEY.

No. 733,534. Patented July 14, 1903.

UNITED STATES PATENT OFFICE.

WILLIAM W. BENSON, OF PHILADELPHIA, PENNSYLVANIA.

COUPLING FOR PIPES, CONDUITS, &c.

SPECIFICATION forming part of Letters Patent No. 733,534, dated July 14, 1903.

Application filed August 16, 1902. Serial No. 119,870. (No model.)

*To all whom it may concern:*

Be it known that I, WILLIAM W. BENSON, a citizen of the United States, and a resident of Philadelphia, in the county of Philadelphia, State of Pennsylvania, have invented certain Improvements in Couplings for Pipes, Conduits, and the Like, of which the following is a specification.

This invention relates particularly to couplings for pipes or conduits such as are employed for holding electric conductors, having reference to the subject-matter disclosed in my contemporaneously-pending application, Serial No. 145,378; and its leading object is to form a tight joint that will not work loose at a reduced cost.

The nature and characteristic features of the improvements will more fully appear by reference to the following description and the accompanying drawings in illustration thereof, of which—

Figure 1:
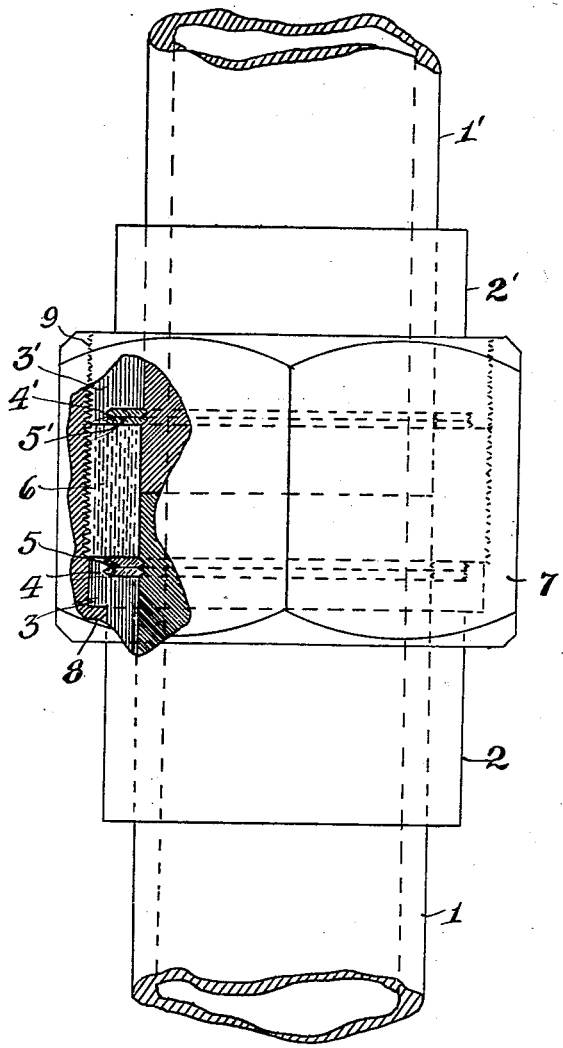
Figure 2:
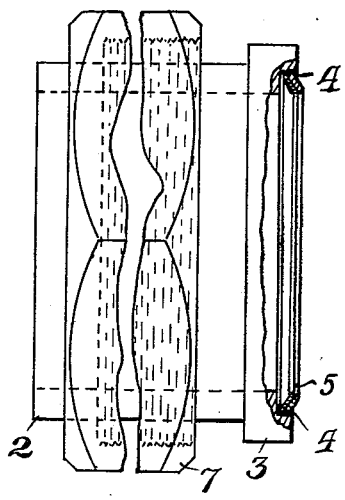
Figure 3:
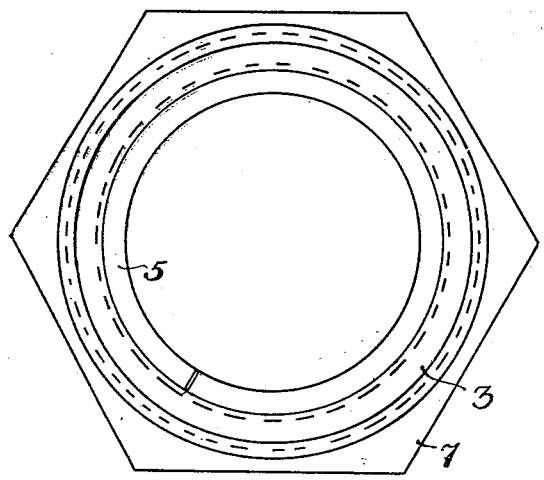
Figure 4:
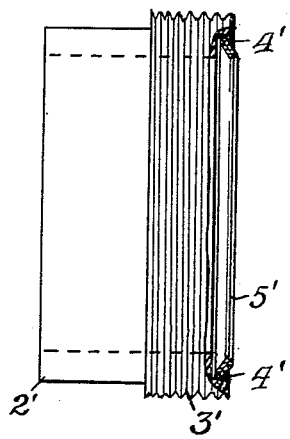
Figure 5:
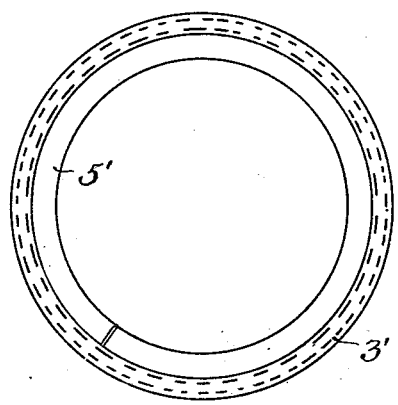

Figure 1 is a plan view, partially in section, in illustration of a coupling made in accordance with my invention. Fig. 2 is a side elevation, partially in section, in illustration of the flanged sleeve and the rings and nut employed therewith. Fig. 3 is an end view of the construction shown in Fig. 2. Fig. 4 is a side elevation, partially in section, of the threaded sleeve and the rings therefor; and Fig. 5 is an end view of the elements shown in Fig. 4.

Referring to the drawings, the alined conduits 1 and 1' have the sleeves 2 and 2' placed thereon, the sleeve 2 having the plain flange 3, provided with a seat or reamed-out portion 4, and the sleeve 2' having the threaded flange 3', provided with the seat or reamed-out portion 4'. The seats 4 and 4' receive the respective split steel rings 5 and 5', which in their initial form have conical faces and sharp edges. When assembled, their outer edges bear against the peripheries of the respective seats 4 and 4', and their inner edges project toward the joint between the conduits. A soft-metal collar 6 encircles the joint between the conduits, against which the inner edges of the rings 5 and 5' press, the metal of the collar being adapted to flow under pressure, so as to seal the joints. A union 7, having a flange 8, adapted for engaging the flange 3, and a thread 9, adapted for engaging the threaded flange 3', is sleeved on the several parts and forces them together and until they are brought to the position shown in Fig. 1, the sleeves 2 2' and the rings 5 5' being pressed against the collar 6 until its substance is forced into the surrounding interstices and configurations, the rings 5 5' being flattened, while their inner edges are forced into the substance of the conduits and their outer edges into the substance of the flanges in which they are seated. By this means the ends of the conduits or pipes are drawn together, held in alinement, and securely locked, while the joint is closely sealed by a simple and inexpensive device.

Having described my invention, I claim—

1. In a coupling, the combination with a conduit, of a collar, adapted to engage said conduit and hold the same in alinement, a ring having sharp edges and faces that are initially of conical form, said ring being sleeved on said conduit and a flanged sleeve adapted to engage said ring and force it against said collar, said ring presenting said sharp edges to said conduit and sleeve, substantially as specified.

2. In a coupling, the combination with a conduit, of a collar, adapted to engage said conduit and hold the same in alinement, a split ring having faces that are initially of conical form, adapted to engage said conduit and collar, and a sleeve adapted to engage said ring and force it against said collar, said ring being thereby caused to bite said conduit and sleeve, substantially as specified.

3. In a coupling, the combination of a conduit, pipe, or the like, with a collar thereon, split rings having sharp edges bearing on said conduit, flanged sleeves having seats adapted for holding said rings, and a union for forcing said sleeves against said rings and collar, whereby said rings are caused to grip said conduit and seats, substantially as specified.

In testimony whereof I have hereunto set my hand, in the presence of the subscribing witnesses, this 15th day of August, 1902.

WM. W. BENSON.

Witnesses:
UTLEY E. CRANE,
C. N. BUTLER.